United States Patent
Parker et al.

(10) Patent No.: US 11,180,023 B2
(45) Date of Patent: Nov. 23, 2021

(54) VEHICLE FOR DETECTION OF IMPAIRED DRIVERS OF OTHER VEHICLES

(71) Applicant: TOYOTA MOTOR ENGINEERING & MANUFACTURING NORTH AMERICA, INC., Plano, TX (US)

(72) Inventors: Nutonya Lynn Parker, Dallas, TX (US); Alexander T. Pham, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 175 days.

(21) Appl. No.: 16/557,809

(22) Filed: Aug. 30, 2019

(65) Prior Publication Data
US 2021/0061098 A1    Mar. 4, 2021

(51) Int. Cl.
| G08G 1/16 | (2006.01) |
| B60K 28/06 | (2006.01) |
| G08G 1/0965 | (2006.01) |
| G08G 1/0967 | (2006.01) |
| B60Q 9/00 | (2006.01) |

(52) U.S. Cl.
CPC ............... B60K 28/06 (2013.01); B60Q 9/00 (2013.01); G08G 1/0965 (2013.01); G08G 1/0967 (2013.01)

(58) Field of Classification Search
None
See application file for complete search history.

(56) References Cited

U.S. PATENT DOCUMENTS

| 6,263,282 | B1 | 7/2001 | Vallancourt |
| 7,777,619 | B2 | 8/2010 | Yopp |
| 8,786,421 | B2 | 7/2014 | Dozza |
| 8,874,301 | B1 | 10/2014 | Rao |
| 10,460,534 | B1 * | 10/2019 | Brandmaier ........... G07C 5/008 |
| 10,762,786 | B1 * | 9/2020 | Dewey .................. B60Q 9/008 |
| 2018/0204459 | A1 * | 7/2018 | Bradley ................. G08G 1/164 |
| 2020/0168099 | A1 * | 5/2020 | Yamaguchi ........ G06K 9/00805 |
| 2021/0070286 | A1 * | 3/2021 | Green ....................... G06T 7/20 |

OTHER PUBLICATIONS

Bus & Truck Drunk Driving Alert Using PIC, https://nevonprojects.com/bus-truck-drunk-driving-alert-using-pic/, website accessed May 16, 2019, NevonProjects.

* cited by examiner

*Primary Examiner* — Brent Swarthout
(74) *Attorney, Agent, or Firm* — Sheppard, Mullin, Richter & Hampton LLP; Hector A. Agdeppa; Daniel N. Yannuzzi

(57) ABSTRACT

According to various embodiments of the disclosed technology, a vehicle may detect impaired drivers of other vehicles. In some embodiments, a first vehicle, comprises a hardware processor; and a non-transitory machine-readable storage medium encoded with instructions executable by the hardware processor to perform a method to determine whether a driver of a second vehicle is impaired, the method comprising: collecting information concerning the second vehicle from one or more sensors mounted on the first vehicle; determining a driving behavior of a driver of the second vehicle based on the information collected by the first vehicle; comparing the determined driving behavior of the driver of the second vehicle with a baseline driving behavior; determining whether the driver of the second vehicle is impaired based on the comparing; and taking one or more actions responsive to determining that the driver of the second vehicle is impaired.

20 Claims, 6 Drawing Sheets

VEHICLE FOR DETECTION OF IMPAIRED DRIVERS OF OTHER VEHICLES

TECHNICAL FIELD

The present disclosure relates generally to vehicles, and in particular, some implementations may relate to vehicles having impaired drivers.

DESCRIPTION OF RELATED ART

Driving while impaired greatly increases the likelihood of a vehicle accident, and so presents a significant threat to public safety. The law recognizes this fact by imposing heavy penalties for driving under the influence of alcohol or drugs. But police cannot be everywhere. And there are other kinds of impairments. For example, a driver may suffer a stroke or seizure.

BRIEF SUMMARY OF THE DISCLOSURE

According to various embodiments of the disclosed technology, a vehicle may detect impaired drivers of other vehicles. In general, one aspect disclosed features a first vehicle, comprising: a hardware processor; and a non-transitory machine-readable storage medium encoded with instructions executable by the hardware processor to perform a method to determine whether a driver of a second vehicle is impaired, the method comprising: collecting information concerning the second vehicle from one or more sensors mounted on the first vehicle; determining a driving behavior of a driver of the second vehicle based on the information collected by the first vehicle; comparing the determined driving behavior of the driver of the second vehicle with a baseline driving behavior; determining whether the driver of the second vehicle is impaired based on the comparing; and taking one or more actions responsive to determining that the driver of the second vehicle is impaired.

Embodiments of the first vehicle may include one or more of the following features. In some embodiments, wherein the one or more actions comprise at least one of: notifying an occupant of the first vehicle; notifying an occupant of the second vehicle; controlling the first vehicle; and notifying a safety authority. In some embodiments, the information concerning the second vehicle comprises: information describing motion of the second vehicle. Some embodiments comprise the first vehicle collecting second information not concerning the second vehicle, wherein determining whether the driver of the second vehicle is impaired is further based on the second information. Some embodiments comprise the first vehicle collecting the second information from one or more second sensors mounted on the first vehicle. In some embodiments, the second information describes at least one of: road conditions; traffic conditions; traffic signals; and weather conditions. Some embodiments comprise receiving a message from at least one vehicle other than the first vehicle, wherein determining whether the driver of the second vehicle is impaired is further based on the message.

A non-transitory machine-readable storage medium encoded with instructions executable by a hardware processor of a computing component, the machine-readable storage medium comprising instructions to cause the hardware processor to perform a method for a first vehicle to determine whether a driver of a second vehicle is impaired, the method comprising: the first vehicle collecting information concerning the second vehicle from one or more sensors mounted on the first vehicle; determining a driving behavior of a driver of the second vehicle based on the information collected by the first vehicle; comparing the determined driving behavior of the driver of the second vehicle with a baseline driving behavior; determining whether the driver of the second vehicle is impaired based on the comparing; and taking one or more actions responsive to determining that the driver of the second vehicle is impaired.

Embodiments of the medium may include one or more of the following features. In some embodiments, the one or more actions comprise at least one of: notifying an occupant of the first vehicle; notifying an occupant of the second vehicle; controlling the first vehicle; and notifying a safety authority. In some embodiments, the information concerning the second vehicle comprises: information describing motion of the second vehicle. Some embodiments comprise the first vehicle collecting second information not concerning the second vehicle, wherein determining whether the driver of the second vehicle is impaired is further based on the second information. Some embodiments comprise the first vehicle collecting the second information from one or more second sensors mounted on the first vehicle. In some embodiments, the second information describes at least one of: road conditions; traffic conditions; traffic signals; and weather conditions. Some embodiments comprise receiving a message from at least one vehicle other than the first vehicle, wherein determining whether the driver of the second vehicle is impaired is further based on the message.

In general, one aspect disclosed features a method for a first vehicle to determine whether a driver of a second vehicle is impaired, the method comprising: the first vehicle collecting information concerning the second vehicle from one or more sensors mounted on the first vehicle; determining a driving behavior of a driver of the second vehicle based on the information collected by the first vehicle; comparing the determined driving behavior of the driver of the second vehicle with a baseline driving behavior; determining whether the driver of the second vehicle is impaired based on the comparing; and taking one or more actions responsive to determining that the driver of the second vehicle is impaired.

Embodiments of the method may include one or more of the following features. In some embodiments, the one or more actions comprise at least one of: notifying an occupant of the first vehicle; notifying an occupant of the second vehicle; controlling the first vehicle; and notifying a safety authority. In some embodiments, the information concerning the second vehicle comprises: information describing motion of the second vehicle. Some embodiments comprise the first vehicle collecting second information not concerning the second vehicle, wherein determining whether the driver of the second vehicle is impaired is further based on the second information. Some embodiments comprise the first vehicle collecting the second information from one or more second sensors mounted on the first vehicle. Some embodiments comprise receiving a message from at least one vehicle other than the first vehicle, wherein determining whether the driver of the second vehicle is impaired is further based on the message.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Modern automobiles provide a fast, safe, efficient, and enjoyable mode of transportation. But in some cases, impaired drivers may imperil others, e.g., drivers/passengers in neighboring vehicles, pedestrians, cyclists, etc. These impairments may range from sleepiness to intoxication or even to medical emergencies.

Embodiments of the systems and methods disclosed herein are directed to vehicles capable of automatically detecting impaired drivers of other vehicles. Some of the vehicles may also detect impairment of their own drivers.

According to the disclosed embodiments, a vehicle may recognize when a driver of another vehicle is impaired, for example by comparing current behavior of the driver to baseline behaviors of drivers. The behaviors may be detected using sensors of the vehicle, and may consider other factors such as road conditions, weather, and the like. Actions on detecting an impaired driver of another vehicle may include alerting the driver of the detecting vehicle, alerting the impaired driver, alerting other vehicles, alerting authorities, and engaging autonomous driving to avoid the other vehicle.

Furthermore, in some embodiments a vehicle may recognize when its own driver is impaired, for example by comparing current behavior of the driver to a baseline behavior. Similar to the detection of behaviors of drivers operating other vehicles, the detection of behavior of a vehicle's own driver may be accomplished using sensors of the vehicle being driven, and may consider road conditions, weather, and the like. And the actions taken on detecting an impaired driver of the vehicle may be similar as well, including alerting the driver, alerting other vehicles, engaging autonomous driving, and alerting authorities, but may additionally include safely stopping the vehicle.

Figure 1:
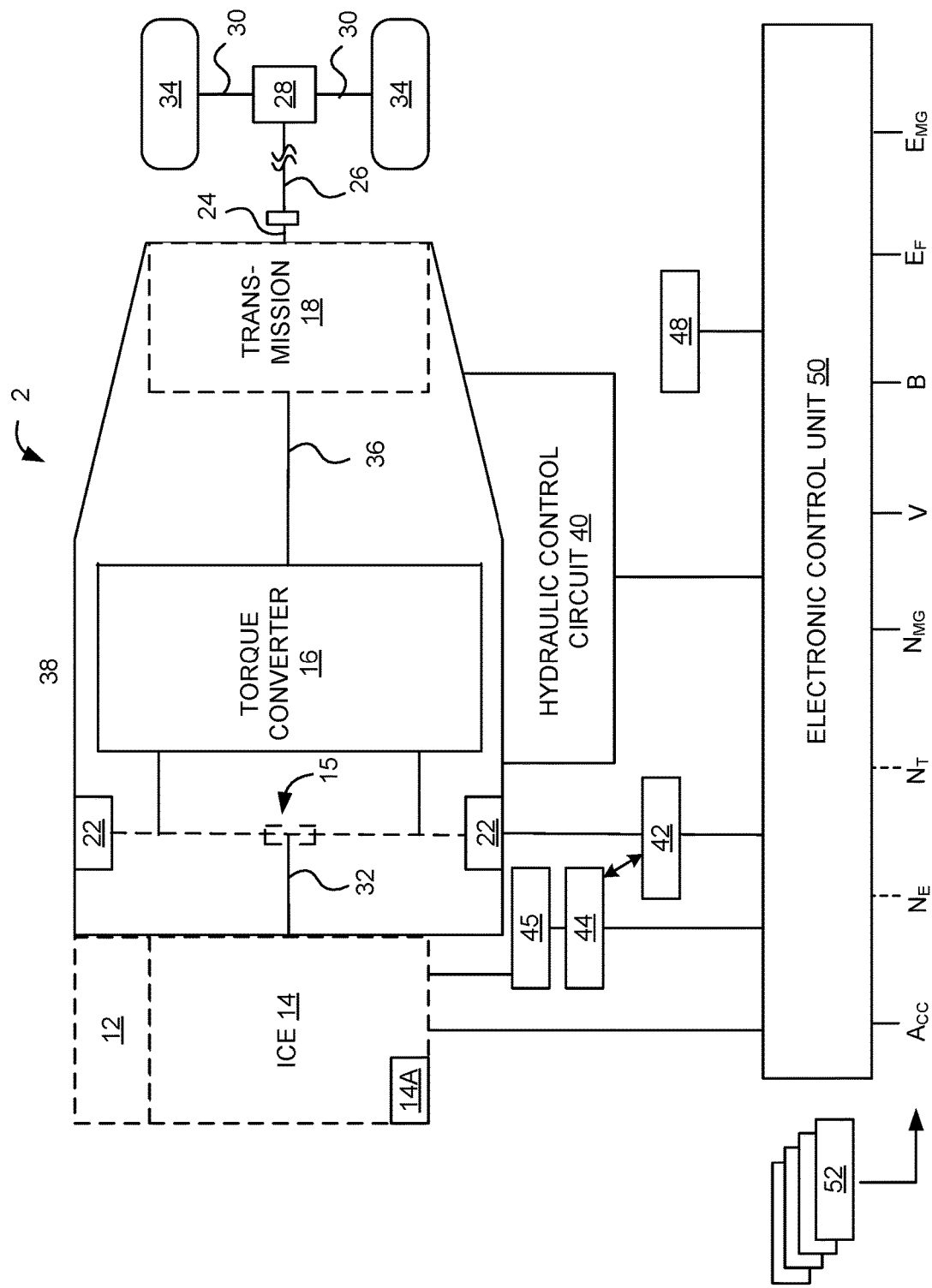
FIG. 1 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for detection of impaired drivers of other vehicles can be implemented in other types of vehicle including gasoline- or diesel-powered vehicles, fuel-cell vehicles, electric vehicles, or other vehicles.

FIG. 1 illustrates a drive system of a vehicle 2 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 2 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 2 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 2. Much of this information is useful for detecting impaired drivers. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. All of these signals may be compared to baseline information to detect erratic operation of the vehicle.

These signals may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 2 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Information collected by these sensors may be used to determine erratic motion of other vehicles, and to detect erratic motion of the sensing vehicle. Image sensors can be used to identify another vehicle, for example by capturing license plate numbers, as well as the make, model, year, and color of other vehicles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as examples of vehicle systems with which embodiments of the disclosed technology may be implemented. One of ordinary skill in the art reading this description will understand how the disclosed embodiments can be implemented with vehicle platforms.

Figure 2:
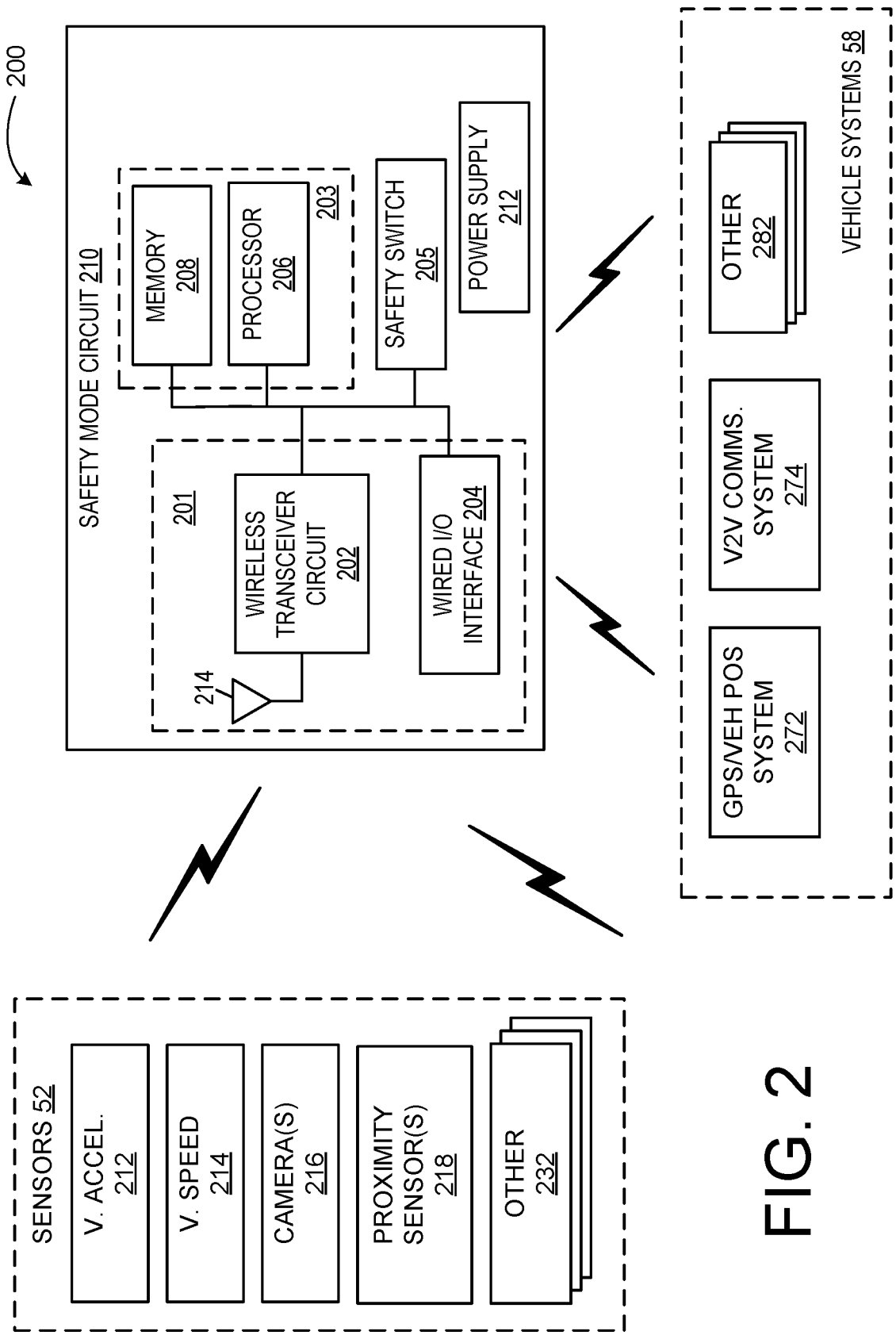
FIG. 2 illustrates an example architecture for detection of impaired drivers of other vehicles in accordance with one embodiment of the systems and methods described herein.

FIG. 2 illustrates an example architecture for detection of impaired drivers of other vehicles in accordance with one embodiment of the systems and methods described herein. Referring now to FIG. 2, in this example, safety mode detection and activation system 200 includes a safety mode circuit 210, a plurality of sensors 52, and a plurality of vehicle systems 58. Sensors 52 and vehicle systems 58 can communicate with safety mode circuit 210 via a wired or wireless communication interface. Although sensors 52 and vehicle systems 58 are depicted as communicating with safety mode circuit 210, they can also communicate with each other as well as with other vehicle systems. Safety mode circuit 210 can be implemented as an ECU or as part of an ECU such as, for example electronic control unit 50. In other embodiments, safety mode circuit 210 can be implemented independently of the ECU.

Safety mode circuit 210 in this example includes a communication circuit 201, a decision circuit 203 (including a processor 206 and memory 208 in this example) and a power supply 212. Components of safety mode circuit 210 are illustrated as communicating with each other via a data bus, although other communication in interfaces can be included. Safety mode circuit 210 in this example also includes a manual safety switch 205 that can be operated by the user to manually select the safety mode.

Processor 206 can include a GPU, CPU, microprocessor, or any other suitable processing system. The memory 208 may include one or more various forms of memory or data storage (e.g., flash, RAM, etc.) that may be used to store instructions and variables for processor 206 as well as any other suitable information. Memory 208, can be made up of one or more modules of one or more different types of memory, and may be configured to store data and other information as well as operational instructions that may be used by the processor 206 to safety mode circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a safety mode circuit 210.

Communication circuit 201 either or both a wireless transceiver circuit 202 with an associated antenna 214 and a wired I/O interface 204 with an associated hardwired data port (not illustrated). As this example illustrates, communications with safety mode circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by safety mode circuit 210 to/from other entities such as sensors 52 and vehicle systems 58.

Wired I/O interface 204 can include a transmitter and a receiver (not shown) for hardwired communications with other devices. For example, wired I/O interface 204 can provide a hardwired interface to other components, including sensors 52 and vehicle systems 58. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and $NiH_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 52 can include, for example, sensors 52 such as those described above with reference to the example of FIG. 1. Sensors 52 can include additional sensors that may or not otherwise be included on a standard vehicle 10 with which the turn safety mode system 200 is implemented. In the illustrated example, sensors 52 include vehicle acceleration sensors 212, vehicle speed sensors 214, cameras 216, and proximity sensors 218. Additional sensors 52 can also be included as may be appropriate for a given implementation of safety mode system 200.

Vehicle systems 58 can include any of a number of different vehicle components or subsystems used to control or monitor various aspects of the vehicle and its performance. In this example, the vehicle systems 58 include a GPS or other vehicle positioning system 272, a vehicle-to-vehicle (V2V) communications 274 system, and other vehicle systems 282.

During operation, safety mode circuit 210 can receive information from various vehicle sensors to determine whether the safety mode should be activated. Also, the driver may manually activate the safety mode by operating safety switch 205. Communication circuit 201 can be used to transmit and receive information between safety mode circuit 210 and sensors 52, and safety mode circuit 210 and vehicle systems 58. Also, sensors 52 may communicate with vehicle systems 58 directly or indirectly (e.g., via communication circuit 201 or otherwise).

In various embodiments, communication circuit 201 can be configured to receive data and other information from sensors 52 used in determining whether to activate the safety mode. Additionally, communication circuit 201 can be used to send an activation signal or other activation information to various vehicle systems 58 as part of entering the safety mode. For example, as described in more detail below, communication circuit 201 can be used to send signals to, for example, one or more of positioning system 272, V2V communications system 274, and other systems 282. The decision regarding what action to take via these various vehicle systems 58 can be made based on the information detected by sensors 52. Examples of this are described in more detail below.

Figure 3:
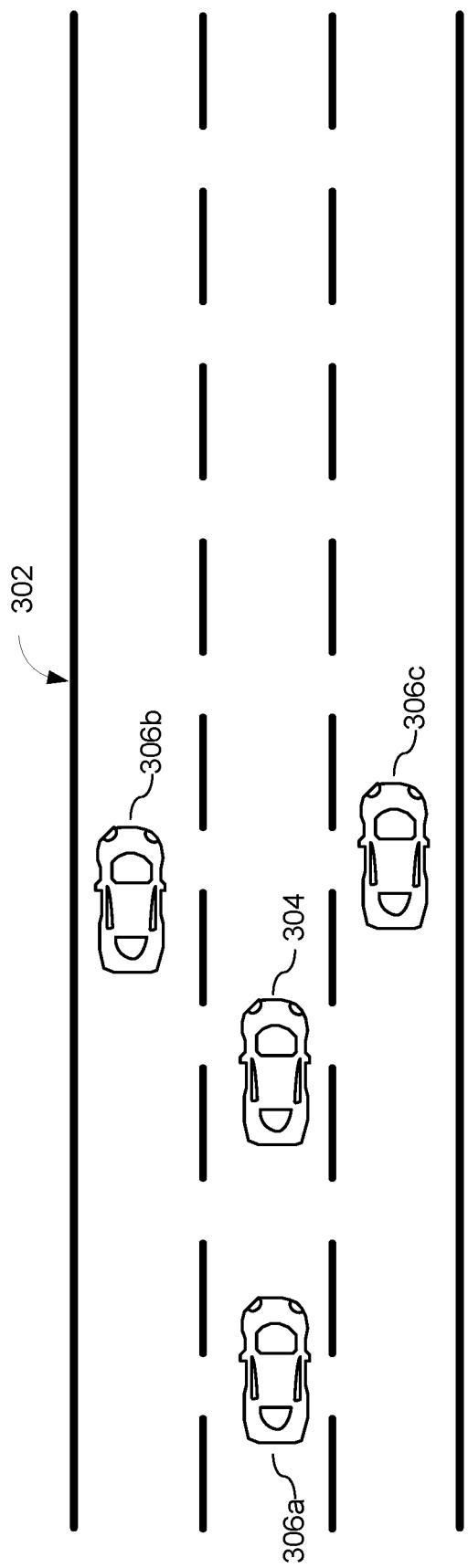
FIG. 3 illustrates a section of a roadway, along with several vehicles traveling along the roadway in the same direction.

FIG. 3 illustrates a section of a roadway, along with several vehicles traveling along the roadway in the same direction. For example, the roadway may be part of a divided highway. Referring to FIG. 3, one vehicle 304 is configured to implement an embodiment of the disclosed technology. For clarity of description, this vehicle 304 will be referred to as the "monitoring vehicle" 304. A number of other vehicles 306a,b,c are also traveling the roadway 302. For clarity of description, these vehicles will be referred to as "monitored vehicles" 306.

Figure 4:
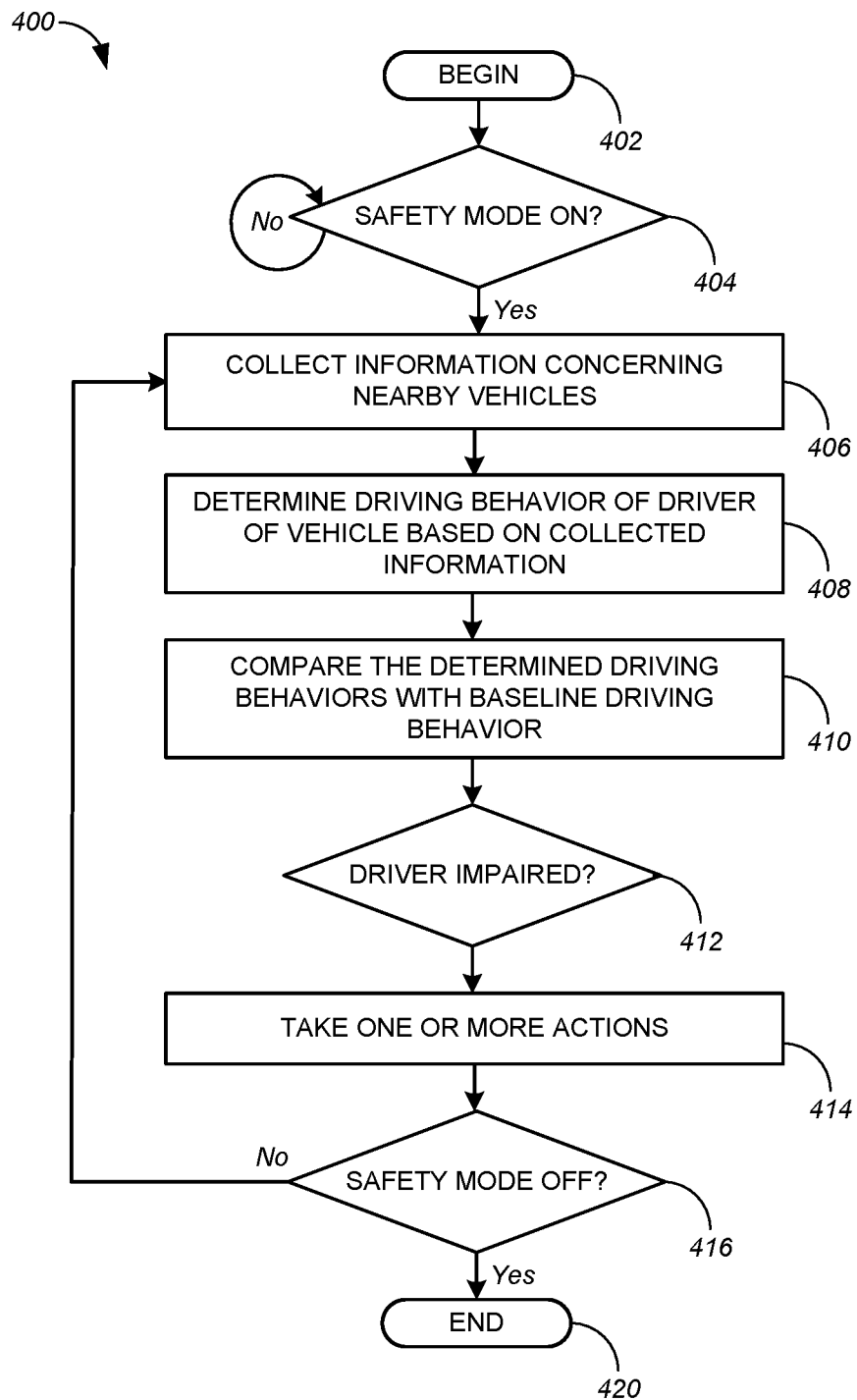
FIG. 4 illustrates a process for the monitoring vehicle of FIG. 3 to detect impaired drivers of other vehicles according to embodiments of the disclosed technology.

FIG. 4 illustrates a process 400 for the monitoring vehicle 304 of FIG. 3 to detect impaired drivers of other vehicles 306 according to embodiments of the disclosed technology. While elements of the process 400 are described in a particular sequence, it should be understood that certain elements of the process 400 may be performed in other sequences, may be performed concurrently, may be omitted, or any combination thereof.

Referring to FIG. 4, the process 400 begins, at 402. The safety mode circuit 210 of the monitoring vehicle 304 first may determine whether the safety mode is on, at 404. This may include determining whether the safety mode has been activated, for example manually by the driver using the safety mode switch 205. The safety mode circuit 210 continues this determination until the safety mode is activated. In some embodiments, the monitoring vehicle 304 may activate the safety mode automatically. For example, the vehicle 304 may activate the safety mode when the vehicle 304 is started, so the driver is always protected, and does not need to remember to activate the safety mode. As another example, the vehicle 304 may activate the safety mode only when the vehicle 304 detects the presence of other vehicles 306. This example may help to reduce false positive identifications of impaired drivers when no vehicles are present. As another example, the vehicle 304 may activate the safety mode only when the vehicle 304 reaches a specified minimum speed at which the probability of an accident occurring is known to rise significantly.

When the safety mode is activated, the safety mode circuit 210 collects information concerning nearby vehicles 306, at 406. The information may be collected in any manner. For example, the information may be collected from the sensors 52 of the monitoring vehicle 304, from other vehicles via the inter-vehicle communications system 274, from the cloud, and from other sources. For each monitored vehicle 306, the data collected may include the location of the monitored vehicle 306, the velocity of the monitored vehicle 306, accelerations and decelerations of the vehicle 306, and data describing other motions of the monitored vehicle 306.

Based on the collected information, the safety mode circuit 210 of the monitoring vehicle 304 may determine a driving behavior for the driver of each monitored vehicle 306, at 408. For example, the driving behavior for a driver may be represented as a driver profile. The driver profile for a monitored vehicle 306 may be kept and updated as long as the monitored vehicle 306 is nearby. The driver profile from monitored vehicle 306 may be stored to be used again should that vehicle 306 reappear.

In some embodiments, monitoring vehicle 304 may share the driver profiles. The sharing of driver profiles may be enabled or disabled by an operator of the monitoring vehicle 304.

Monitoring vehicle 304 may share driver profiles with other monitoring vehicles 304, for example using vehicle-to-vehicle communications. For example, when a monitored vehicle 306 leaves the vicinity, monitoring vehicle 304 may share the driver profile for that vehicle 306 such that the profile follows or even precedes the monitored vehicle 306. In this manner, other vehicles may be made aware of the approach of a vehicle driven by an impaired driver.

Monitoring vehicle 304 may share driver profiles with safety authorities, for example using vehicle-to-infrastructure communications. The safety authorities may include police departments, fire departments, ambulance services, tollbooth operators, and the like. These safety authorities may use the driver profiles to locate and stop the vehicle. These safety authorities may also share the driver profiles, with each other, and with other vehicles.

Each driver profile may include numerical scores for a plurality of aspects of the driving behavior. The aspects may represent, for example, lane changes without signaling, tailgating, speeding, driving too slowly, weaving, unnecessary braking, violations of traffic regulations, remaining stopped when a traffic light turns green, driving at night with headlights off, improper use of signals, improper use of the horn, improper use of headlights, throwing objects from the vehicle, breaking traction, leaving a rotary island to the right, and the like. The aspect scores may be kept such that high scores indicate driver impairment. For example, a vehicle that weaves often will receive a high score for weaving. In some embodiments, the scores in a driver profile may be combined to generate a composite driver score. For example, the composite driver score may be a weighted sum of the aspect scores for the driver.

Referring again to FIG. 4, the monitoring vehicle 304 may compare each driving behavior with a baseline driving behavior, at 410. For nearby monitored vehicles 306, the monitoring vehicle 304 may make these comparisons frequently, continually, continuously, or the like. Each comparison may include comparing a driver profile with a baseline driving profile. The monitoring vehicle 304 may store the baseline driving profile, and may update the baseline driving profile frequently, continually, continuously, or the like. The monitoring vehicle 304 may update the baseline driving profile according to updates received from the cloud, the driving profiles the monitoring vehicle 304 collects, the information the monitoring vehicle 304 collects concerning the monitored vehicles 306, other information, and the like.

Referring again to FIG. 4, the monitoring vehicle 304 may determine whether any drivers of the monitored vehicles 306 are impaired based on the comparison of their driving behaviors with the baseline driving behavior, at 412. The comparison may include comparison of the driver profiles to the baseline profile. In some embodiments, comparing a driver profile to a baseline driving profile may include determining differences between the two profiles. In such embodiments, the baseline driving profile may include aspect scores, composite scores, and the like. The difference between the two profiles may be expressed as differences between the respective aspect scores, differences between the composite scores, and the like. In such embodiments, a large difference may indicate an impaired driver.

To determine whether a driver is impaired, the monitoring vehicle 304 may compare one or more of those score differences to a respective threshold value. For example, the monitoring vehicle 304 may store a composite threshold value for comparison with a difference between the composite score of the driver profile and the composite score of the baseline driving profile. When the difference exceeds the composite threshold value, the monitoring vehicle 304 may determine that the driver is impaired.

Responsive to determining that the driver of a monitored vehicle 306 is impaired, the monitoring vehicle 304 may take one or more actions, at 414. In some embodiments, the actions include notifying an occupant of the monitoring vehicle 304. The notification may take any form. For example, the monitoring vehicle 304 may announce the notification audibly, display notification on a display of the monitoring vehicle 304, sound a warning buzzer in the cabin of the monitoring vehicle 304, or the like, or any combination thereof. The notification may identify the monitored vehicle 306 driven by the driver deemed impaired. An example notification may be as follows. "The driver of the blue sedan to your left seems impaired."

In some embodiments, the actions taken by the monitoring vehicle 304 on determining a driver is impaired may include notifying a safety authority. The safety authorities may include police departments, fire departments, ambulance services, tollbooth operators, and the like. The notification may include information describing the monitored vehicle 306, for example including license plate number, color, make, model, year of manufacture, and the like. The notification may include a photo of the vehicle. The notification may include video of the vehicle. The video may include footage of the vehicle engaged in illicit behaviors such as speeding, tailgating, and the like. The notification may include information to help locate the vehicle, for example including the vehicle's location, direction, speed, and the like. These safety authorities may use the information in the notification to locate and stop the vehicle. These safety authorities may also share the notification, with each other, and with other vehicles.

In some embodiments, the actions taken by the monitoring vehicle 304 on determining a driver is impaired may include controlling the monitoring vehicle 304. For example, on determining that the driver of a nearby vehicle 306 is impaired, the monitoring vehicle 304 may slow, so as to increase the distance between the two vehicles. As another example, on determining that the driver of an oncoming vehicle 306 is impaired, the monitoring vehicle 304 may maneuver so as to avoid the oncoming vehicle 306.

In some embodiments, the actions taken by the monitoring vehicle 304 upon a determination that a driver of a monitored vehicle 306 is impaired may include notifying an occupant of that monitored vehicle 306. For example, the monitoring vehicle 304 may send an emergency message to the monitored vehicle 306 using vehicle-to-vehicle communications. On receiving the emergency message, the monitored vehicle 306 may announce the message to the occupants of that vehicle 306 (which can include the driver), sound an alarm buzzer within the cabin of the monitored vehicle 306, or the like. The notification may allow occupants of the monitored vehicle 306 to take control of the vehicle 306. For example, the driver may have fallen asleep, and on being notified of this fact, a passenger may wake the driver, take control of the vehicle, or the like, thereby avoiding a vehicle accident.

In some embodiments, the monitored vehicle 306 may perform one or more actions responsive to receiving a notification that the driver of the monitored vehicle may be impaired. In some embodiments, the actions may include controlling the monitored vehicle 306. For example, the monitored vehicle 306 may engage an autonomous driving capability to slow and stop in a safe location. These embodiments are applicable to cases where the monitored vehicle 306 does not possess a capability to determine whether its driver is impaired. These embodiments are also applicable to cases where the monitored vehicle 306 does possess a capability to determine whether its driver is impaired, but that capability has been disabled, has not detected that its driver is impaired, or the like.

In some cases it may not be desirable for the monitoring vehicle 304 to control the monitored vehicle 306, for example due to the possibility of abuse. In such embodiments, the actions described above may be initiated by appropriate authorities responsive to receiving a notification from the monitoring vehicle 304 that the driver of the monitored vehicle 306 appears to be impaired. In these embodiments, the notification may include data to support an assertion that the driver of the monitored vehicle 306 appears to be impaired. The data may include images, video, other data, and the like, to assist the authorities in determining whether the driver of the monitored vehicle 306 is impaired, that the monitored vehicle 306 should be controlled, and the like. Based on the notification and data, the authorities may control the monitored vehicle 306, for example as described above. In some embodiments, the authorities may control the monitored vehicle 306 directly, or through a third party such as a manufacturer of the monitored vehicle 306, or the like. In some embodiments, the authorities may include a manufacturer of the monitored vehicle 306, or the like.

In some embodiments, the determination of whether a driver is impaired may include consideration of one or more mitigating factors. Such embodiments may avoid false positive determinations. In some embodiments, the mitigating factors considered may relate to conditions of the roadway 302. For example, when the roadway is rough and potholed, a driver might be swerving intentionally to avoid the larger potholes. In this example, the swerving aspect of the driver's profile may be discounted, ignored, omitted from the profile comparison, or the like (hereinafter collectively referred to as "discounted").

The mitigating factors considered when determining whether a driver is impaired may relate to weather conditions. For example, when the road is icy, the breaking traction aspect may be discounted. As another example, when high crosswinds are present, the swerving aspect may be discounted.

The mitigating factors considered when determining whether a driver is impaired may relate to traffic conditions. For example, when a monitored vehicle 306 is engaged in stop-and-go traffic, aspects of the driver's profile that are related to unusual accelerations, unusual decelerations, and unusually slow driving may be discounted. As another example, when a monitored vehicle 306 is enmeshed in traffic traveling well above the speed limit, aspects of the driver's profile that are related to speeding may be discounted.

In some embodiments, determination of whether a driver is impaired may include consideration of one or more aggravating factors. Such embodiments may avoid false negative determinations. For example, the aggravating factors may relate to traffic signals. In this example, when a monitored vehicle 306 remains stopped long after a traffic light has turned green for that vehicle, the driver's composite score and/or one or more aspect scores may be increased. As another example, when a monitored vehicle 306 breaks traction while speeding through a red light, the driver's composite score and/or one or more aspect scores may be increased.

In some embodiments, determination of whether a driver of a monitored vehicle 306 is impaired may include consideration of one or more messages received from the monitored vehicle 306. The driver of a monitored vehicle 306 may have a known health condition that may impair his driving. For example, the driver may be subject to fainting spells. Accordingly, the driver may have configured the vehicle 306 to broadcast emergency messages when the collected information indicates that the driver may have fainted. In this example, the monitoring vehicle 304 may use such messages to bias the determination in favor of impairment. In some cases, the monitoring vehicle 304 may determine the driver of the monitored vehicle 306 is impaired based only on one or more of the emergency messages.

Referring again to FIG. 4, the safety mode circuit 210 occasionally may determine whether the safety mode has been deactivated, at 416. While the safety mode is active, the safety mode circuit 210 continues to collect data concerning nearby vehicles, determine driving behavior of those vehicles, determine whether their drivers are impaired, and take action on determining that a driver is impaired. When the safety mode is deactivated, the process 400 ends, at 420. In some embodiments, the safety mode may be deactivated manually by the driver using the safety mode switch 205. In some embodiments, the vehicle 304 may deactivate the safety mode automatically, for example when the vehicle 304 is turned off, when the vehicle 304 detects no other vehicles 306 are present, when the vehicle speed falls below a specified minimum speed, and the like.

Figure 5:
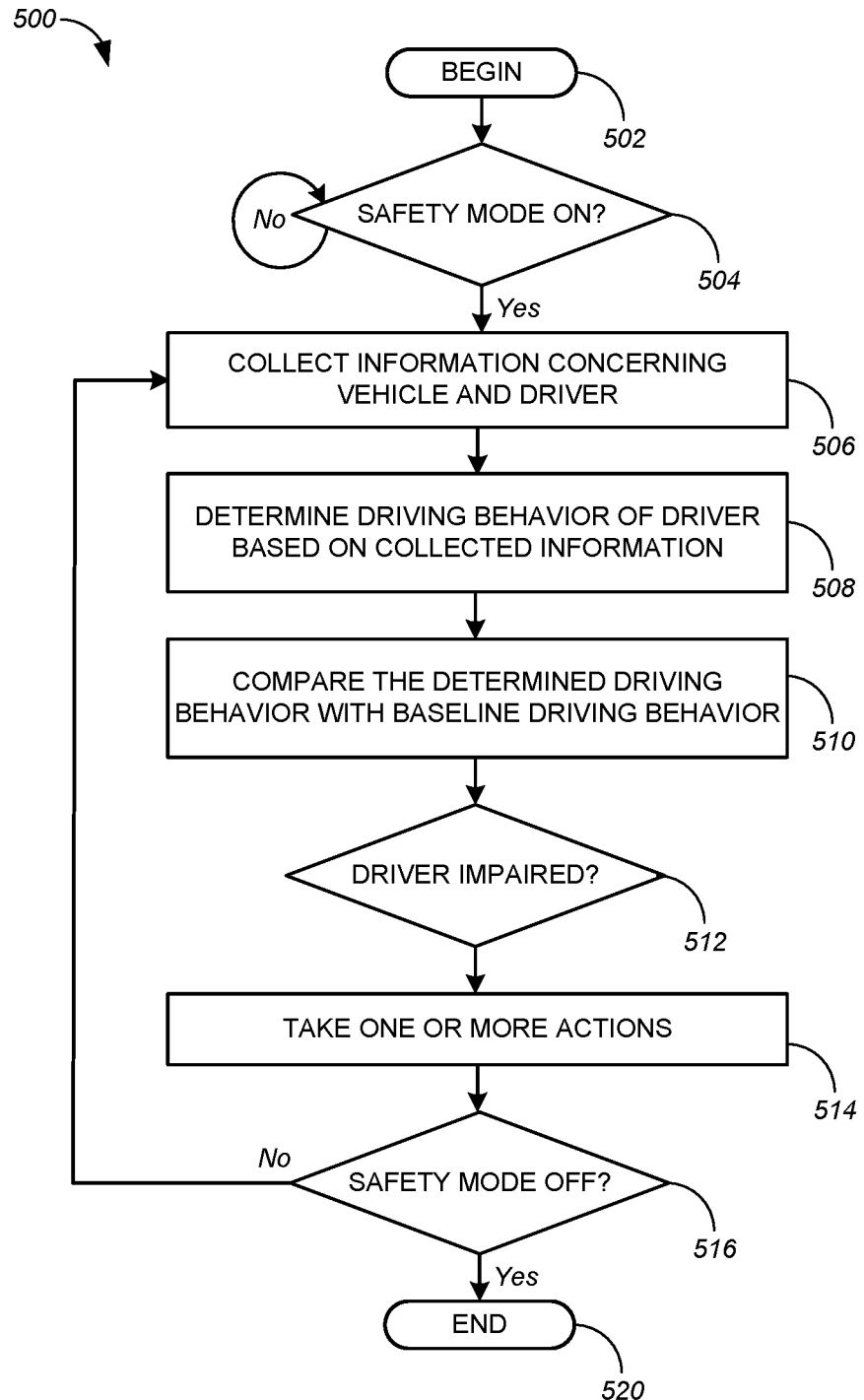
FIG. 5 illustrates a process for the monitoring vehicle of FIG. 3 to determine whether its driver is impaired according to embodiments of the disclosed technology.

In some embodiments, the monitoring vehicle 304 may monitor itself and/or its driver. That is, the monitoring vehicle 304 may determine whether its driver is impaired. FIG. 5 illustrates a process 500 for the monitoring vehicle 304 of FIG. 3 to determine whether its driver is impaired according to embodiments of the disclosed technology. While elements of the process 500 are described in a particular sequence, it should be understood that certain elements of the process 500 may be performed in other sequences, may be performed concurrently, may be omitted, or any combination thereof.

Referring to FIG. 5, the process 500 begins, at 502. The safety mode circuit 210 of the monitoring vehicle 304 first may determine whether the safety mode is on, at 504, for example as described above. When the safety mode is activated, the safety mode circuit 210 collects information concerning the vehicle 304 and the driver of the vehicle 304, at 506. The information may be collected in any manner. The information concerning the vehicle 304 may be collected from the sensors 52 of the vehicle 304, from other vehicles via the inter-vehicle communications system 274, from the cloud, and from other sources. The data concerning the vehicle 304 may include the location of the vehicle 304, the velocity of the vehicle 304, accelerations and decelerations of the vehicle 304, and data describing other motions of the vehicle 304.

The information concerning the driver may be collected from the sensors 52 of the vehicle 304. For example, the steering wheel or gearshift knob of the vehicle may include sensors for detecting a heart rate of the driver. As another example, the driver's seat may include sensors for measuring the driver's temperature, perspiration rate, and the like. The information concerning the driver may be collected from a wearable device worn by the driver. For example, a wearable bracelet may collect a heart rate for the driver, and may include a wireless transmitter to transmit the heart rate data to the vehicle 304.

Based on the collected information, the safety mode circuit 210 of the monitoring vehicle 304 may determine a driving behavior for the driver, at 508. For example, the driving behavior for the driver may be represented as a driver profile. The driver profile may be kept and updated as long as the driver is driving the vehicle 304. The driver profile may be stored to be used again should that driver return to driving the vehicle 304.

In some embodiments, the vehicles 304 may share the driver profiles. The sharing of driver profiles may be enabled or disabled by an occupant of the vehicle 304. The vehicle 304 may share driver profiles with other vehicles, for example using vehicle-to-vehicle communications.

The vehicle 304 may share the driver profiles with safety authorities, for example using vehicle-to-infrastructure communications. The safety authorities may include police departments, fire departments, ambulance services, tollbooth operators, and the like. These safety authorities may use the driver profiles to locate and stop the vehicle. These safety authorities may also share the driver profiles, with each other, and with other vehicles.

The driver profile may include numerical scores for a plurality of aspects of the driving behavior, and the scores in the driver profile may be combined to generate a composite driver score, for example as described above. In these embodiments, the aspects of the driving behavior may include not only the information concerning the vehicle, but also the information concerning the driver. Therefore each score may represent an aspect of the information concerning the vehicle, an aspect of the information concerning the driver, or both. Similar techniques may be employed to include the data concerning the driver in the driver profile.

Referring again to FIG. 5, the vehicle 304 may compare the driving behavior with a baseline driving behavior, at 510. The vehicle 304 may make these comparisons frequently, continually, continuously, or the like. The vehicle 304 may store the baseline driving profile, and may update the baseline driving profile frequently, continually, continuously, or the like. The vehicle 304 may update the baseline driving profile according to updates received from the cloud, the information the monitoring vehicle 304 collects, other information, and the like.

Referring again to FIG. 5, the vehicle 304 may determine whether the driver of the vehicle 304 is impaired based on the comparison of his driving behavior with the baseline driving behavior, at 512. The comparison may include comparison of the driver profile to the baseline driving profile. The profiles may include data concerning the driver. In some embodiments, comparing the driver profile to the baseline driving profile may include determining differences between the two profiles, for example as described above.

Responsive to determining that the driver is impaired, the vehicle 304 may take one or more actions, at 514. In some embodiments, the actions include notifying the driver, another occupant of the monitoring vehicle 304, or both. The notification may take any form, for example as described above. An example notification may be as follows. "The driver of the this vehicle seems impaired."

In some embodiments, the actions taken by the monitoring vehicle 304 on determining a driver is impaired may include notifying a safety authority. The safety authorities may include police departments, fire departments, ambulance services, tollbooth operators, and the like. The notification may include information describing the monitored vehicle 306, and information to help locate the vehicle, for example as described above. These safety authorities may also share the notification, with each other, and with other vehicles. In some embodiments, the feature of notifying safety authorities may be customized by an occupant of the vehicle 304. For example, the feature may notify ambulance and fire crews, but not police.

In some embodiments, the actions taken by the vehicle 304 on determining the driver is impaired may include controlling the vehicle 304. For example, on determining that the driver is impaired, the vehicle 304 may stop in a safe area.

In some embodiments, the actions taken by the vehicle 304 may include notifying occupants of other vehicles. For example, the vehicle 304 may send an emergency message to other vehicles using vehicle-to-vehicle communications. On receiving the emergency message, the other vehicles may announce the message to the occupants of that vehicle 306, sound an alarm buzzer within the cabin of the vehicle, or the like.

In some embodiments, the determination of whether a driver is impaired may include consideration of mitigating factors, aggravating factors, and the like, for example as described above.

Referring again to FIG. 5, the safety mode circuit 210 occasionally may determine whether the safety mode has been deactivated, at 516. While the safety mode is active, the safety mode circuit 210 continues to collect data concerning the vehicle and driver, determine driving behavior, determine whether the driver is impaired, and take action on determining that the driver is impaired. When the safety mode is deactivated, the process 500 ends, at 520. In some embodiments, the safety mode may be deactivated manually by the driver using the safety mode switch 205. In some embodiments, the vehicle 304 may deactivate the safety mode automatically, for example when the vehicle 304 is turned off, when the vehicle 304 detects no other vehicles 306 are present, when the vehicle speed falls below a specified minimum speed, and the like.

Figure 6:
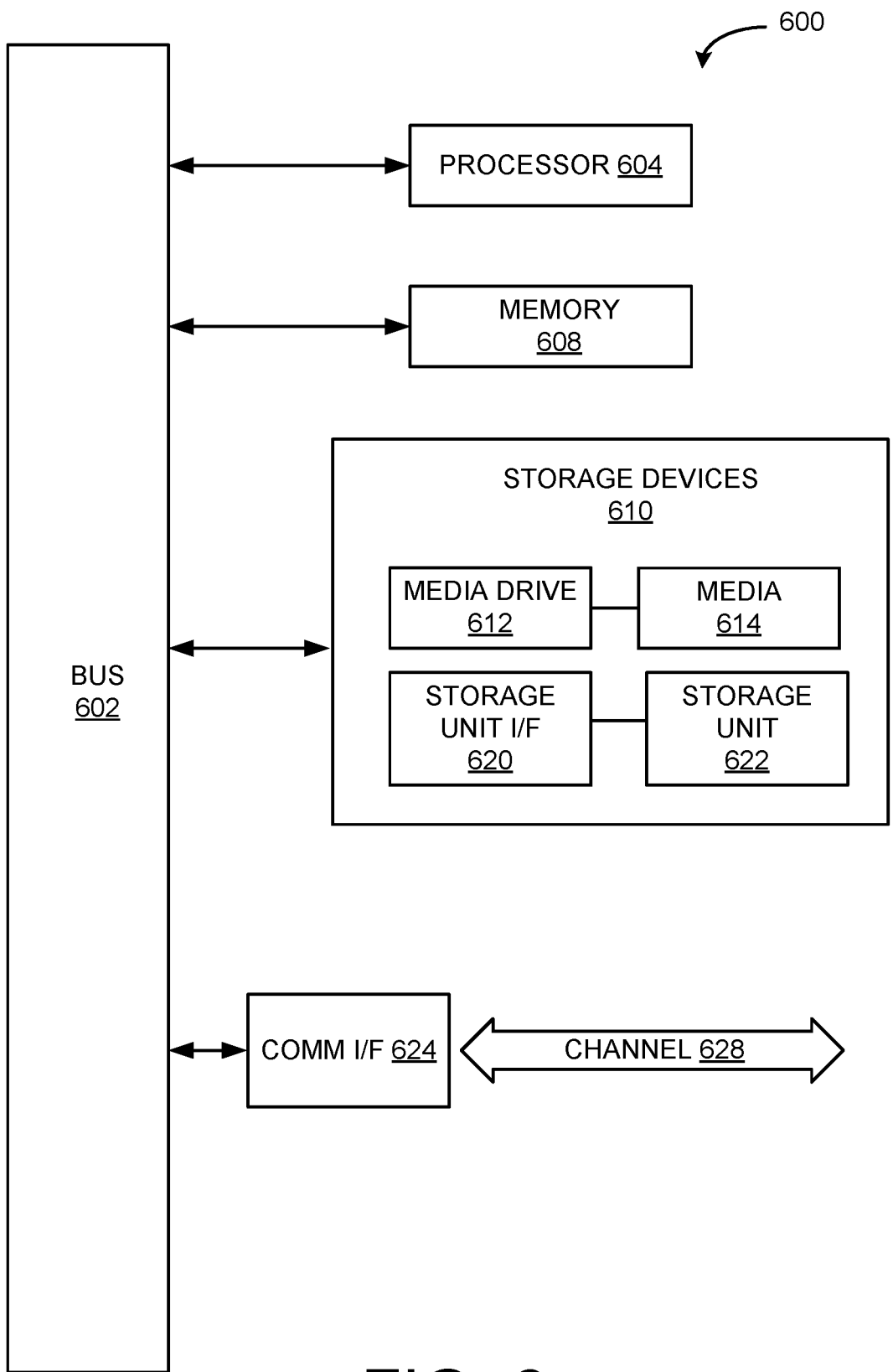
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 604. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A first vehicle, comprising:
   a hardware processor; and
   a non-transitory machine-readable storage medium encoded with instructions executable by the hardware processor to perform a method to determine whether a driver of a second vehicle is impaired, the method comprising:
   collecting information concerning the second vehicle from one or more sensors mounted on the first vehicle;
   determining a driving behavior of a driver of the second vehicle based on the information collected by the first vehicle;
   creating a driver profile based on the driving behavior of the driver of the second vehicle and updating the driver profile so long as the second vehicle remains nearby the first vehicle or upon nearby reappearance of the second vehicle;
   comparing the driver profile with a baseline driving behavior;
   determining whether the driver of the second vehicle is impaired based on the comparing; and
   taking one or more actions responsive to determining that the driver of the second vehicle is impaired.

2. The first vehicle of claim 1, wherein the one or more actions comprise at least one of:
   notifying an occupant of the first vehicle;
   notifying an occupant of the second vehicle;
   controlling the first vehicle; and
   notifying a safety authority.

3. The first vehicle of claim 1, wherein the information concerning the second vehicle comprises:
   information describing motion of the second vehicle.

4. The first vehicle of claim 3, the method further comprising:
   the first vehicle collecting the information from one or more second sensors mounted on the first vehicle.

5. The first vehicle of claim 3, wherein the information is reflective of at least one of:
   road conditions;
   traffic conditions;
   traffic signals; and
   weather conditions.

6. The first vehicle of claim 1, the method further comprising:
sharing, with one or more other vehicles, the driver profile of the driver of the second vehicle, responsive to determining that the driver of the second vehicle is impaired.

7. The first vehicle of claim 1, the method further comprising:
receiving a message from at least one vehicle other than the first vehicle, wherein determining whether the driver of the second vehicle is impaired is further based on the message.

8. A non-transitory machine-readable storage medium encoded with instructions executable by a hardware processor of a computing component, the machine-readable storage medium comprising instructions to cause the hardware processor to perform a method for a first vehicle to determine whether a driver of a second vehicle is impaired, the method comprising:
the first vehicle collecting information concerning the second vehicle from one or more sensors mounted on the first vehicle;
determining a driving behavior of a driver of the second vehicle based on the information collected by the first vehicle;
creating a driver profile based on the driving behavior of the driver of the second vehicle and updating the driver profile so long as the second vehicle remains nearby the first vehicle or upon nearby reappearance of the second vehicle;
comparing the driver profile with a baseline driving behavior;
determining whether the driver of the second vehicle is impaired based on the comparing; and
taking one or more actions responsive to determining that the driver of the second vehicle is impaired.

9. The medium of claim 8, wherein the one or more actions comprise at least one of:
notifying an occupant of the first vehicle;
notifying an occupant of the second vehicle;
controlling the first vehicle; and
notifying a safety authority.

10. The medium of claim 8, wherein the information concerning the second vehicle comprises:
information describing motion of the second vehicle.

11. The medium of claim 10, the method further comprising:
the first vehicle collecting the information from one or more second sensors mounted on the first vehicle.

12. The method of claim 10, wherein the information is reflective of at least one of:
road conditions;
traffic conditions;
traffic signals; and
weather conditions.

13. The medium of claim 8,
the method further comprising:
sharing, with one or more other vehicles, the driver profile of the driver of the second vehicle, responsive to determining that the driver of the second vehicle is impaired.

14. The medium of claim 8, the method further comprising:
receiving a message from at least one vehicle other than the first vehicle, wherein determining whether the driver of the second vehicle is impaired is further based on the message.

15. A method for a first vehicle to determine whether a driver of a second vehicle is impaired, the method comprising:
the first vehicle collecting information concerning the second vehicle from one or more sensors mounted on the first vehicle;
determining a driving behavior of a driver of the second vehicle based on the information collected by the first vehicle;
creating a driver profile based on the driving behavior of the driver of the second vehicle and updating the driver profile so long as the second vehicle remains nearby the first vehicle or upon nearby reappearance of the second vehicle;
comparing the driver profile with a baseline driving behavior;
determining whether the driver of the second vehicle is impaired based on the comparing; and
taking one or more actions responsive to determining that the driver of the second vehicle is impaired.

16. The method of claim 15, wherein the one or more actions comprise at least one of:
notifying an occupant of the first vehicle;
notifying an occupant of the second vehicle;
controlling the first vehicle; and
notifying a safety authority.

17. The method of claim 15, wherein the information concerning the second vehicle comprises:
information describing motion of the second vehicle.

18. The method of claim 17, further comprising:
the first vehicle collecting the information from one or more second sensors mounted on the first vehicle.

19. The method of claim 15, further comprising:
sharing, with one or more other vehicles, the driver profile of the driver of the second vehicle, responsive to determining that the driver of the second vehicle is impaired.

20. The method of claim 15, further comprising:
receiving a message from at least one vehicle other than the first vehicle, wherein determining whether the driver of the second vehicle is impaired is further based on the message.

* * * * *